US012619481B2

(12) United States Patent
Johnson

(10) Patent No.: US 12,619,481 B2
(45) Date of Patent: May 5, 2026

(54) DATA-STREAMING SYSTEM OVERLAY INFRASTRUCTURE FOR DEPLOYMENT PIPELINES

(71) Applicant: Boost SubscriberCo L.L.C., Englewood, CO (US)

(72) Inventor: Matthew Johnson, Parker, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 554 days.

(21) Appl. No.: 18/310,851

(22) Filed: May 2, 2023

(65) Prior Publication Data

US 2024/0370316 A1 Nov. 7, 2024

(51) Int. Cl.
　*G06F 9/54* (2006.01)
　*G06F 8/60* (2018.01)
　*H04L 65/60* (2022.01)

(52) U.S. Cl.
　CPC ............... *G06F 9/542* (2013.01); *G06F 8/60* (2013.01); *H04L 65/60* (2013.01)

(58) Field of Classification Search
None
See application file for complete search history.

(56) References Cited

U.S. PATENT DOCUMENTS 9,760,366 B2 * 9/2017 Frank .................... G06F 16/958
10,171,383 B2 * 1/2019 Johnston ................. H04L 47/83

| | | | | |
|---|---|---|---|---|
| 10,735,262 B1 * | 8/2020 | Webb | .................. | H04L 41/0866 |
| 2004/0177352 A1 * | 9/2004 | Narayanaswamy | ...... | G06F 8/61 717/169 |
| 2006/0123387 A1 * | 6/2006 | Shim | ....................... | G06F 9/445 717/100 |
| 2016/0098307 A1 * | 4/2016 | Bora | ....................... | G06F 9/541 719/313 |
| 2017/0371636 A1 * | 12/2017 | Palavalli | ............... | G06F 9/5077 |
| 2018/0321993 A1 * | 11/2018 | McClory | ............. | H04L 41/5041 |
| 2019/0317757 A1 * | 10/2019 | Jodoin | ...................... | G06F 8/40 |
| 2020/0159501 A1 * | 5/2020 | Bodin | ..................... | H04L 67/53 |
| 2022/0311794 A1 * | 9/2022 | Maya | .................. | G06F 11/0766 |
| 2024/0362153 A1 * | 10/2024 | Sriramdas | ........... | G06F 11/3692 |

* cited by examiner

*Primary Examiner* — Charles E Anya

(74) *Attorney, Agent, or Firm* — Kilpatrick Townsend & Stockton LLP

(57) ABSTRACT

Systems, machine-readable media, and methods may facilitate data-streaming system overlay infrastructures for deployment pipelines. An event-streaming infrastructure may be overlaid on an event-streaming service system of a cloud environment so that a deployment pipeline to test and deploy software to a production computing service is integrated with the cloud environment to facilitate producing and consuming event data from the deployment pipeline. The event-streaming infrastructure may facilitate onboarding of applications to produce and consume event data via the event-streaming service system of the cloud environment. The event-streaming infrastructure may configure the event-streaming service system of the cloud environment to facilitate producing and consuming event data under defined topics mapped to environments of the deployment pipeline. The event-streaming infrastructure may facilitate authentication and linking of service accounts to produce event data under the defined topics mapped to the environments of the deployment pipeline.

20 Claims, 8 Drawing Sheets

[×]

Figure 5:
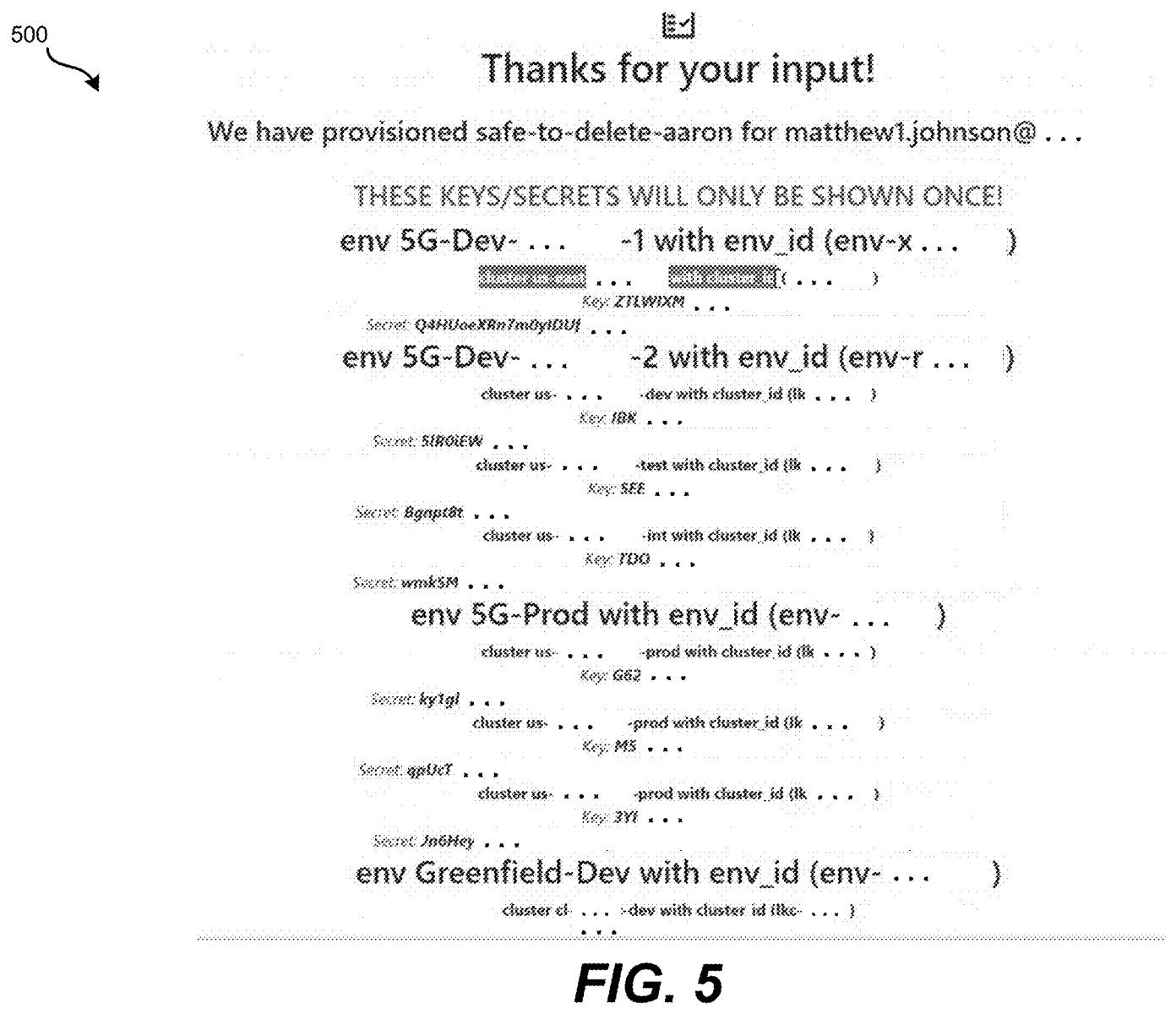

Thanks for your input!

We have provisioned safe-to-delete-aaron for matthew1.johnson@ . . .

THESE KEYS/SECRETS WILL ONLY BE SHOWN ONCE!

env 5G-Dev- . . .    -1 with env_id (env-x . . . )

⬛⬛⬛⬛⬛    ⬛⬛⬛⬛⬛( . . . . )

*Secret: Q4HUzeRM7mhyI2U7 . . . .*    *Key: ZTLWSXM . . . .* env 5G-Dev- . . .    -2 with env_id (env-r . . . )

cluster us- . . .    -dev with cluster_id (llk . . . )

*Secret: SU4OBEW . . . .*    *Key: HIR . . . .* cluster us- . . .    -test with cluster_id (llk . . . )

*Secret: Bxgopht . . . .*    *Key: SFE . . . .* cluster us- . . .    -int with cluster_id (llk . . . )

*Secret: wrmkSH . . . .*    *Key: TDO . . . .* env 5G-Prod with env_id (env- . . . )

cluster us- . . .    -prod with cluster_id (llk . . . )

*Secret: ky1gJ . . . .*    *Key: G62 . . . .* cluster us- . . .    -prod with cluster_id (llk . . . )

*Secret: aptlvT . . . .*    *Key: MS . . . .* cluster us- . . .    -prod with cluster_id (llk . . . )

*Secret: Jn6Hey . . . .*    *Key: 3YI . . . .* env Greenfield-Dev with env_id (env- . . . )

cluster cl- . . .    -dev with cluster_id (llke- . . . )

Topic Creation
Topic Details

Destination Account

605    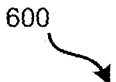 Greenfield

○ 5G

Topic Name - please see topic naming convention here 610    safe-to-delete-poc

Application Name (consumer group)

615    aarons-app

Producers/Consumers

620    ☑ Does your topic require producer access?

Producers

625    safe-to-delete-aaron        Select

☐ Does your topic require consumer access?

Advanced Options

Partitions 630    default (3 for ng, 6 for p)

Retention Period (days)

635    default (7 days)

SUBMIT

Publish/Subscribe to a Topic

Topic Details

Destination Account

705    ◉ Greenfield

○ SG

Destination Environment 710    dev                                            ⌄ dev

Top    int 715      test prod

Application Name (consumer group)

720    app name

Producers/Consumers

725    ☐ Does your topic require producer access?

☐ Does your topic require consumer access?

Advanced Options

Submit

DATA-STREAMING SYSTEM OVERLAY INFRASTRUCTURE FOR DEPLOYMENT PIPELINES

FIELD

Disclosed embodiments according to the present disclosure relate generally to deployment pipelines, and in particular to systems, methods, and computer-readable media for data-streaming system overlay infrastructures for deployment pipelines.

BACKGROUND

Generally, interfacing with event-streaming platforms of cloud environments may be complex and time-consuming to set up, depending on the particulars of the implementation interfacing with the event-streaming platforms. Conventionally, this may require a manual process that can take one or more engineers many hours to complete and may still result in insufficient integration between a particular implementation and a particular event-streaming platform. Such manual processes may require high levels of effort that may be time-consuming, cumbersome, inefficient, and otherwise undesirable.

There is a need for systems, methods, and computer-readable media for data-streaming system overlay infrastructures for deployment pipelines that solve such issues. This and other needs are addressed by the present disclosure.

BRIEF SUMMARY

Disclosed embodiments according to the present disclosure relate generally to deployment pipelines, and in particular to systems, methods, and computer-readable media for data-streaming system overlay infrastructures for deployment pipelines.

In one aspect, a system is disclosed. The system may include one or more processing devices and memory communicatively coupled with and readable by the one or more processing devices and having stored therein processor-readable instructions which, when executed by the one or more processing devices, cause the one or more processing devices to perform one or a combination of the following operations. An event-streaming infrastructure may be over-laid on an event-streaming service system of a cloud environment so that a deployment pipeline to test and deploy software to a production computing service is integrated with the cloud environment to facilitate producing and consuming event data from the deployment pipeline. The event-streaming infrastructure may facilitate onboarding of applications to produce and consume event data via the event-streaming service system of the cloud environment. The event-streaming infrastructure may configure the event-streaming service system of the cloud environment to facili-tate producing and consuming event data under defined topics mapped to environments of the deployment pipeline. The event-streaming infrastructure may facilitate authenti-cation and linking of service accounts to produce event data under the defined topics mapped to the environments of the deployment pipeline. An interface may be generated with the event-streaming infrastructure to obtain specifications of an application to produce and consume event data via the event-streaming service system of the cloud environment. The specifications that correspond to the application may be processed with the event-streaming infrastructure to produce and consume event data via the event-streaming service system of the cloud environment. Authentication and linking may be facilitated with the event-streaming infrastructure of a service account associated with the application to produce and consume event data mapped to one or more environ-ments of the deployment pipeline.

In another aspect, one or more non-transitory, machine-readable media are disclosed. The one or more non-transi-tory, machine-readable media may have machine-readable instructions thereon which, when executed by one or more processing devices, cause the one or more processing devices to perform one or a combination of the following operations. An event-streaming infrastructure may be over-laid on an event-streaming service system of a cloud envi-ronment so that a deployment pipeline to test and deploy software to a production computing service is integrated with the cloud environment to facilitate producing and consuming event data from the deployment pipeline. The event-streaming infrastructure may facilitate onboarding of applications to produce and consume event data via the event-streaming service system of the cloud environment. The event-streaming infrastructure may configure the event-streaming service system of the cloud environment to facili-tate producing and consuming event data under defined topics mapped to environments of the deployment pipeline. The event-streaming infrastructure may facilitate authenti-cation and linking of service accounts to produce event data under the defined topics mapped to the environments of the deployment pipeline. An interface may be generated with the event-streaming infrastructure to obtain specifications of an application to produce and consume event data via the event-streaming service system of the cloud environment. The specifications that correspond to the application may be processed with the event-streaming infrastructure to produce and consume event data via the event-streaming service system of the cloud environment. Authentication and linking may be facilitated with the event-streaming infrastructure of a service account associated with the application to produce and consume event data mapped to one or more environ-ments of the deployment pipeline.

In yet another aspect, a method is disclosed and may include one or a combination of the following. An event-streaming infrastructure may be overlaid on an event-streaming service system of a cloud environment so that a deployment pipeline to test and deploy software to a pro-duction computing service is integrated with the cloud environment to facilitate producing and consuming event data from the deployment pipeline. The event-streaming infrastructure may facilitate onboarding of applications to produce and consume event data via the event-streaming service system of the cloud environment. The event-stream-ing infrastructure may configure the event-streaming service system of the cloud environment to facilitate producing and consuming event data under defined topics mapped to envi-ronments of the deployment pipeline. The event-streaming infrastructure may facilitate authentication and linking of service accounts to produce event data under the defined topics mapped to the environments of the deployment pipe-line. An interface may be generated with the event-streaming infrastructure to obtain specifications of an application to produce and consume event data via the event-streaming service system of the cloud environment. The specifications that correspond to the application may be processed with the event-streaming infrastructure to produce and consume event data via the event-streaming service system of the cloud environment. Authentication and linking may be facilitated with the event-streaming infrastructure of a service account associated with the application to produce and consume event data mapped to one or more environments of the deployment pipeline.

In various embodiments, specifications of the service account may be processed, and the specifications of the service account may be used to create the service account with the event-streaming service system. In various embodiments, the authenticating the service account corresponding to the application may include causing generating of a set of one or more keys and/or one or more secrets for subsequent use by the application when interacting with the event-streaming service. The application may be subsequently authenticated based at least in part on the set of one or more keys and/or one or more secrets when the application subsequently interacts with the event-streaming service. In various embodiments, the set of one or more keys and/or one or more secrets may be exposed to the application. In various embodiments, topic specifications corresponding to a defined topic mapped to the one or more environments of the deployment pipeline may be processed.

In various embodiments, based at least in part on the topic specifications, the event-streaming service system of the cloud environment may be configured to facilitate producing and consuming event data under the defined topics mapped to the one or more environments of the deployment pipeline. A first set of event data from the application and/or at least one environment of the one or more environments may be communicated to the event-streaming service system. A second set of event data may be received from the event-streaming service system. The second set of event data may be communicated to the application and/or a second application corresponding to the at least one environment. In various embodiments, the event-streaming infrastructure may correspond to infrastructure as code.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5 illustrates an example list of account identifiers and associated keys and secrets, in accordance with embodiments according to the present disclosure.

FIG. 6 illustrates an example interface to facilitate topic creation and obtaining topic specifications, in accordance with embodiments according to the present disclosure.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Various embodiments according to the present disclosure may provide for technological solutions to multiple problems existing with conventional systems and approaches to software changes in deployment pipelines used to facilitate production computing services. Conventional systems and approaches are deficient in addressing, with flexibility and speed, software changes in a manner that is streamlined from the viewpoint of users. However, various embodiments according to the present disclosure may provide for automation of software changes in an application deployment pipeline that accelerates the speed of making software changes with flexibility to accommodate a variety of software change needs and in a manner that is streamlined from the viewpoint of users.

Various embodiments will now be discussed in greater detail with reference to the accompanying figures, beginning with FIG. 1.

Figure 1:
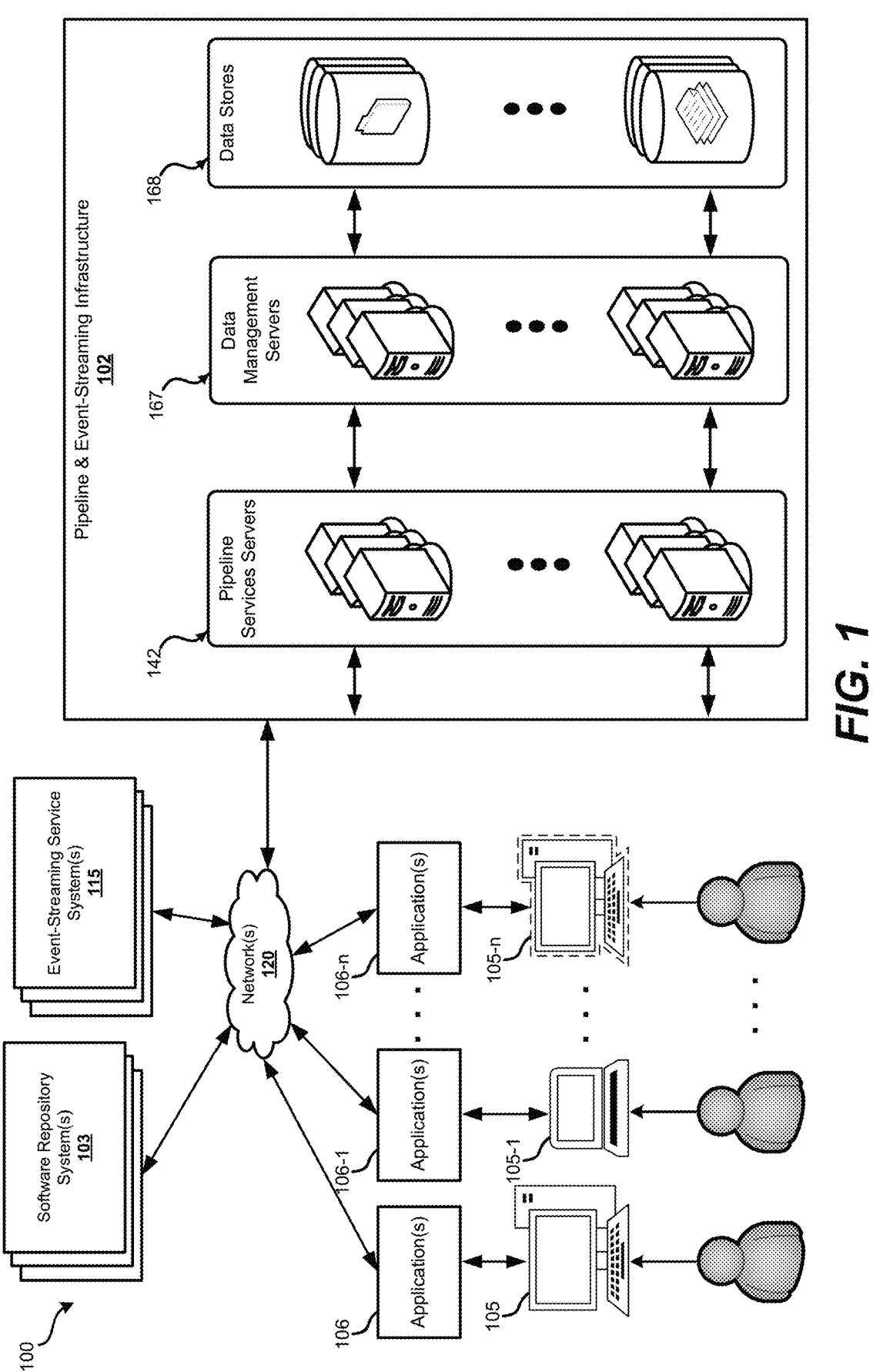
FIG. 1 illustrates a high-level block diagram of an environment to facilitate a production computing service deploy via continuous deployment pipeline, in accordance with embodiments according to the present disclosure.

FIG. 1 depicts a high-level block diagram of an environment 100 to facilitate a production computing service deploy via continuous deployment pipeline, in accordance with certain embodiments of the present disclosure. In some embodiments, the environment 100 may be a cloud computing environment. The environment 100 may correspond to a distributed system that includes one or more client computing devices 105. In various embodiments, each client computing device 105 may be configured to operate one or more client applications 106 such as a web browser, a proprietary client application, a web-based application, an entity portal, a mobile application, a widget, or some other application, which may be used by a user of the endpoint device to interact with a pipeline and event-streaming infrastructure 102, one or more software repository systems 103, and one or more event-streaming service systems 115 to use services provided by the pipeline and event-streaming infrastructure 102, the software repository systems 103, and the event-streaming service systems 115 over one or more network(s) 120.

A developer, using a client computing device 105, may interact with the pipeline and event-streaming infrastructure 102 by requesting one or more services provided by the pipeline and event-streaming infrastructure 102. In some embodiments, the developer may access a cloud user interface. The pipeline services provided by the pipeline and event-streaming infrastructure 102 may include virtual machine instances for the developers to use, in some embodiments. The client computing devices 105 may be general purpose personal computers including, by way of example, personal computers and/or laptop computers running various versions of Microsoft Windows®, Apple Macintosh®, and/or Linux operating systems. The client computing devices can be workstation computers running any of a variety of UNIX® or UNIX-like operating systems, including without limitation the variety of GNU/Linux operating systems, such as for example, Google Chrome OS. Alternatively, or in addition, client computing devices 105 may be any other electronic device, such as a thin-client computer capable of communicating over network(s) 120. The client computing devices 105 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, and/or the like, and being Internet, e-mail, short message service (SMS), or other communication protocol enabled.

In general, the one or more networks 120 may be used for bi-directional communication paths for data transfer between components of environment 100. Disclosed embodiments may transmit and receive data, including video content, via the networks 120 using any suitable protocol(s). The networks 120 may be or include one or more next-generation networks (e.g., 5G wireless networks and beyond). Further, the plurality of networks 120 may correspond to a hybrid network architecture with any number of terrestrial and/or non-terrestrial networks and/or network features, for example, cable, satellite, wireless/cellular, or Internet systems, or the like, utilizing various transport technologies and/or protocols, such as radio frequency (RF), optical, satellite, coaxial cable, Ethernet, cellular, twisted pair, other wired and wireless technologies, and the like. In various instances, the networks 120 may be implemented with, without limitation, satellite communication with a plurality of orbiting (e.g., geosynchronous) satellites, a variety of wireless network technologies such as 5G, 4G, LTE (Long-Term Evolution), 3G, GSM (Global System for Mobile Communications), another type of wireless network (e.g., a network operating under Bluetooth®, any of the Institute of Electrical and Electronics (IEEE) 802.11 suite of protocols, and/or any other wireless protocol), a wireless local area network (WLAN), a HAN (Home Area Network) network, another type of cellular network, the Internet, a wide area network (WAN), a local area network (LAN) such as one based on Ethernet, Token-Ring and/or the like, such as through etc., a gateway, and/or any other appropriate architecture or system that facilitates the wireless and/or hardwired packet-based communications of signals, data, and/or message in accordance with embodiments disclosed herein. In various embodiments, the networks 120 and its various components may be implemented using hardware, software, and communications media such wires, optical fibers, microwaves, radio waves, and other electromagnetic and/or optical carriers; and/or any combination of the foregoing and/or the like. In various instances, the networks 120 may transmit data using any suitable communication protocol(s), such as TCP/IP (Transmission Control Protocol/Internet protocol), SNA (systems network architecture), IPX (Internet packet exchange), UDP, AppleTalk, and/or the like.

One or more server systems may be communicatively coupled with one or more remote computing devices 105 via the network(s) 120. For example, the environment 100 may include the pipeline and event-streaming infrastructure 102 that may include or otherwise correspond to one or more server systems. Further, the environment 100 may include the one or more software repository systems 103 and the one or more event-streaming service systems 115 that may include or otherwise correspond to one or more server systems. Likewise, in some embodiments, the client computing side of the environment 100 may include or otherwise correspond to one more server systems.

In various embodiments, the one or more server systems may be adapted to run one or more services or software applications provided by one or more of the components of the respective system (e.g., the pipeline and event-streaming infrastructure 102 and the event-streaming service system 115). In some embodiments, these services may be offered as web-based or cloud services, under a Software as a Service (SaaS) model and/or a hybrid SaaS and self-management model, and/or the like to the users of client computing devices 105. Users operating client computing devices 105 may in turn utilize one or more client applications to interact with the pipeline and event-streaming infrastructure 102, the one or more software repository systems 103, and/or the one or more event-streaming service systems 115 to utilize the services provided by these systems.

The one or more server systems of the pipeline and event-streaming infrastructure 102 may implement software components to facilitate various embodiments disclosed herein. In some embodiments, one or more of the components of the pipeline and event-streaming infrastructure 102 and/or the services provided by components thereof may also be implemented by one or more of the client computing devices 105. Users operating the client computing devices 105 may then utilize one or more client applications 106 to use the services provided by these components. These components may be implemented in hardware, firmware, software, or combinations thereof. It should be appreciated that various system configurations are possible, which may be different from the distributed system. The embodiment shown in the figure is thus one example of a distributed system for implementing an exemplary system and is not intended to be limiting.

As illustrated, various embodiments may include one or more pipeline services servers 142, one or more data management servers 167 configured to manage pipeline services data and one or more data stores 168 (which may store pipeline services data), and/or the like. The one or more pipeline services servers 142 may be configured to provide deployment pipeline and event-streaming services (e.g., to developers using the client computing devices 105) to facilitate production computing services. With the pipeline and event-streaming services provided, developers may provision, launch, and manage virtual computing resources in the cloud. Such cloud-based pipeline and event-streaming services may be provided for various geographic locations/ regions and may be segregated in a variety of manners according to geographic, jurisdictional, and/or designs to minimize faults, maximize availability, minimize latency, and/or the like.

In some embodiments, the services provided by the pipeline and event-streaming infrastructure 102 may include one or more services provided under Software as a Service (SaaS) category, a Platform as a Service (PaaS) category, an Infrastructure as a Service (IaaS) category, or other categories of services including a hybrid SaaS category and hybrid services. Developers may order one or more services provided by the pipeline and event-streaming infrastructure 102. The pipeline and event-streaming infrastructure 102 may then perform processing to provide the services in accordance with the orders.

In some embodiments, the services provided by the pipeline and event-streaming infrastructure 102 may include, without limitation, application services, platform services, and infrastructure services. In some examples, application services may be provided by the cloud infrastructure system via a SaaS platform. The SaaS platform may be configured to provide cloud services that fall under the SaaS category or a hybrid SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, developers may utilize applications executing on the cloud pipeline and event-streaming infrastructure 102. Various SaaS services may be provided.

In some embodiments, platform services may be provided by the cloud pipeline and event-streaming infrastructure 102 via a PaaS platform. The PaaS platform may be configured to provide cloud pipeline services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. By utilizing the pipeline services provided by the PaaS platform, developers may employ programming languages and tools supported by the cloud infrastructure system and control the deployed services. In some embodiments, platform services provided by the cloud infrastructure system may include database cloud services, middleware cloud services, and Java cloud services. Middleware cloud services may provide a platform for developers to develop and deploy various business applications, and Java cloud services may provide a platform for customers to deploy Java applications, in the cloud pipeline and event-streaming infrastructure system 102. Various infrastructure services may be provided by an IaaS platform in the cloud pipeline and event-streaming infrastructure system 102. The infrastructure services facilitate the management and control of the underlying computing resources, such as storage, networks, and other fundamental computing resources for users utilizing services provided by the SaaS platform and the PaaS platform.

In some embodiments, cloud management functionality may be provided by one or more modules, such as an order management module, an order orchestration module, an order provisioning module, an order management and monitoring module, an identity management module, and/or the like. These modules may include or be provided using one or more computers and/or servers, which may be general purpose computers, specialized server computers, server farms, server clusters, or any other appropriate arrangement and/or combination.

In various embodiments, the pipeline and event-streaming infrastructure 102 may be composed of one or more specialized computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, the pipeline and event-streaming infrastructure 102 may be adapted to run one or more services described herein. The pipeline and event-streaming infrastructure 102 may run an operating system, which may correspond to a server operating system. The pipeline and event-streaming infrastructure 102 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those available from AWS, Oracle, Microsoft, Sybase, IBM (International Business Machines), and the like.

The one or more data stores 168 may include one or more databases that may reside in a variety of locations. By way of example, one or more databases may reside on a nontransitory storage medium local to (and/or resident in) one or more servers of the pipeline and event-streaming infrastructure 102. Alternatively, databases may be remote from one or more servers and in communication with the one or more servers via a network-based or dedicated connection. In one set of embodiments, databases may reside in a storage-area network (SAN). Similarly, any necessary files for performing the functions attributed to the one or more servers may be stored locally on the one or more servers and/or remotely, as appropriate. In one set of embodiments, the databases may include relational databases that are adapted to store, update, and retrieve data in response to SQL-formatted commands.

The pipeline services provided by the pipeline and event-streaming infrastructure 102 may be structured in stages and may facilitate building, testing, and releasing software to production services. Further, once software is deployed to production service, various changes to the software may be needed (e.g., the code, application, and/or specifications corresponding to a change in previously deployed software). The process of making software changes may involve software change request (SCR) processes. As referenced herein, a software change request (SCR) may include not only the request, but also the software change (e.g., the code, application, and/or specifications corresponding to the software change). Moreover, while embodiments are disclosed herein with respect to SCRs as an example, is embodiments may likewise be applicable to initial code deployments and not just the software changes that follow initial code deployments.

As disclosed further herein, the pipeline services provided by the pipeline and event-streaming infrastructure 102 may further facilitate setup, configuration, and use of the event-streaming services of the event-streaming service system 115. For example, the pipeline and event-streaming infrastructure 102 may include an event-streaming configurer and/or an event-streaming engine configured to facilitate setup, configuration, and use of the event-streaming services of the event-streaming service system 115. To facilitate setup, configuration, and use of the event-streaming services of the event-streaming service system 115, the pipeline and event-streaming infrastructure 102 may be overlaid on the event-streaming service system 115 so that the deployment pipeline may be integrated with the cloud environment of the event-streaming service system 115. The event-streaming configurer and/or the event-streaming engine may facilitate the overlay with various operations disclosed herein. The pipeline and event-streaming infrastructure 102 may provide one or more event-streaming service self-serve tools that may facilitate setup, configuration, and use of the event-streaming services of the event-streaming service system 115.

The use of the event-streaming services of the event-streaming service system 115 may include one or more applications 106, the one or more client computing devices 105, and/or other components of the environment 100 producing and/or consuming pipeline data feeds, pipeline event updates, and/or pipeline messages that are facilitated by the event-streaming service system 115, for example, with the event-streaming engine. The event-streaming service system 115 may be configured to provide message queuing with one or more nodes that queue data, where the data may originate from one or more nodes that produce data and the data may be sent to one or more nodes that consume data. The event-streaming service system 115 may correspond to a distributed publish-subscribe messaging system that maintains feeds of messages on different topics, where producers write messages to various topics, consumers read messages from various topics, topics are partitioned and replicated across multiple nodes, and each topic partition may be treated as an ordered set of messages retained and accessible for a certain period of time.

In some implementations, the pipeline and event-streaming infrastructure 102 may include one or more tools, applications, and/or other software (which, in various embodiments, may correspond to the event-streaming engine) to analyze and consolidate pipeline data feeds, pipeline event updates, and/or other pipeline messages received from and/or sent to one or more applications 106 and/or users of client computing devices 105. As an example, pipeline data feeds, pipeline event updates, and/or other pipeline messages may include, but are not limited to, updates, which may be real-time updates, received from the one or more applications 106, the one or more client computing devices 105, the event-streaming service system 115, the software repository system 103, and/or other components of the pipeline and event-streaming infrastructure 102, which may include real-time pipeline events related to deployment, software change requests, software changes, and the like aspects disclosed herein. The pipeline and event-streaming infrastructure 102 may also include one or more tools, applications, and/or other software (which, in various embodiments, may correspond to the event-streaming engine) to facilitate displaying the pipeline data feeds, pipeline event updates, and/or pipeline messages via one or more display devices of client computing devices 105.

Figure 2:
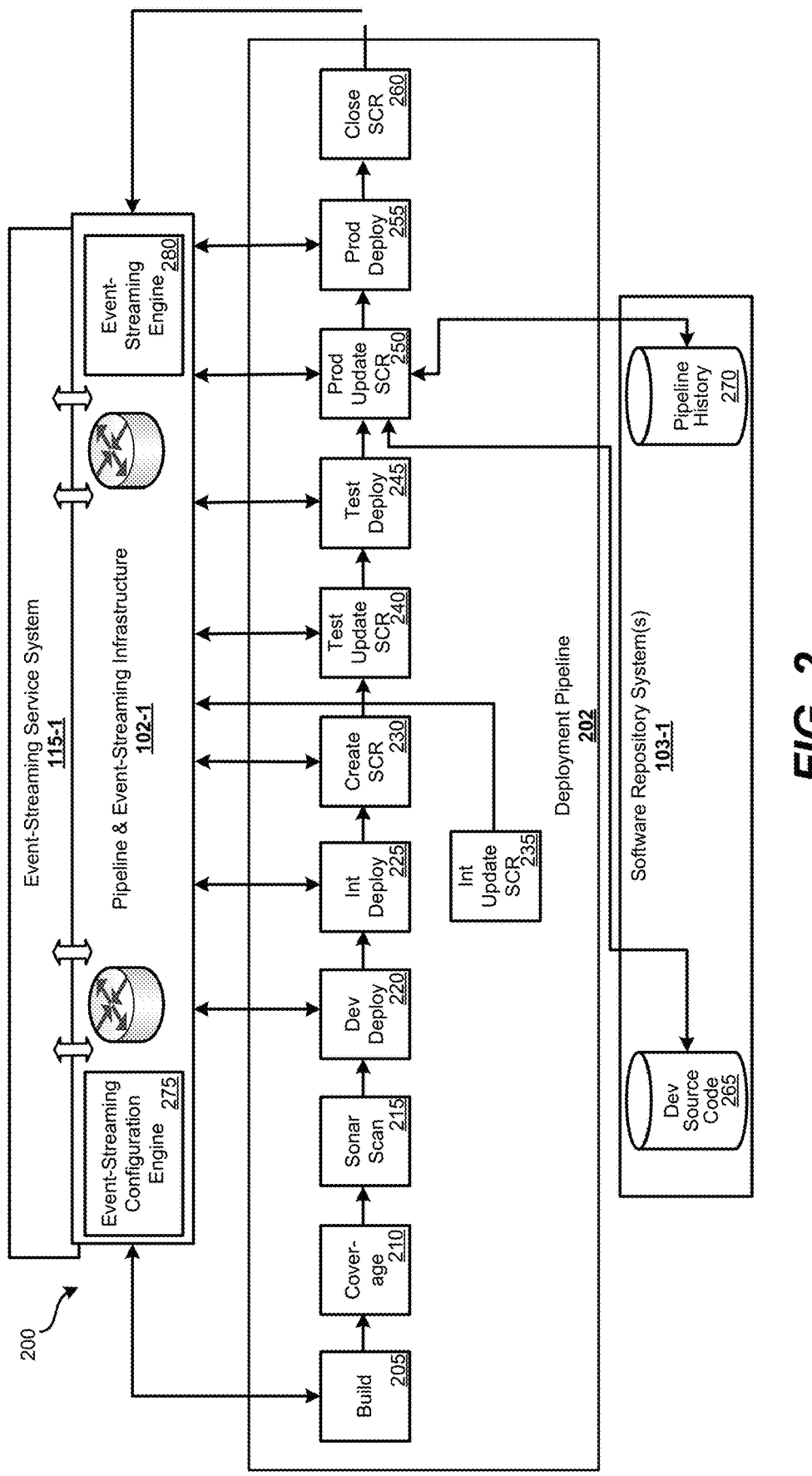
FIG. 2 illustrates a functional diagram of one example deployment pipeline system to facilitate pipeline services integrated with event-streaming services of an event streaming service system, in accordance with embodiments according to the present disclosure.

FIG. 2 illustrates a functional diagram of one example pipeline system 200 to facilitate pipeline services integrated with event-streaming services of the event streaming service system 115, in accordance with embodiments of the present disclosure. While the pipeline system 200 is illustrated as being composed of multiple components, the pipeline system 200 may be broken into a greater number of components or collapsed into fewer components. Each component may include any one or combination of computerized hardware, software, and/or firmware. The pipeline system 200 may include one or a combination of the pipeline and event-streaming infrastructure 102, a deployment pipeline 202, the event streaming service system 115, and one or more software repository systems 103. The deployment pipeline 202 may be configured to operate in accordance with a deployment pipeline flow to facilitate pipeline services. The deployment pipeline 202 may be a centralized pipeline. In some embodiments, the deployment pipeline flow may operate according to the operational flow diagram depicted in the example of FIG. 2. The example deployment pipeline flow may illustrate deployment stages of the deployment pipeline 202, through at least some of which software building, testing, integration, and deployment may progress.

The pipeline services may include pipeline deployment agents of the pipeline infrastructure 102 that may include software applications to automate software deployment and software changes deployment through various stages to production services corresponding to a production deployment 255. Such automation of software and software change deployments may include continuously integrating software, configuration states, scripts, artifacts, and or the like into production services corresponding to production deployment 255. The pipeline deployment agents may facilitate the deployment pipeline in stages that may include preproduction stages, where the developed software may be automatically tested. The stages may further include deployment integration testing with the software deployed in a preproduction environment, which may allow for testing with traffic and data that may correspond to actual traffic and data that will be experienced in the production environment. In various embodiments, such preproduction stages and/or deployment integration stages may include a build stage 205, a coverage stage 210, a sonar-scan stage 215, an initial development environment 220, an integration environment 225, an SCR creation stage 230, an SCR integration update stage 235, an SCR testing update stage 240, a deployment testing stage 245, an SCR production update stage 250, and/or other alpha, beta, and/or gamma testing stages. Once gamma testing is successfully completed and validated, the software may be pushed to production with the production stage 255. This may involve the pipeline deployment agents partially, incrementally, and/or fully deploying the software to production service.

With one or more of the preproduction stages, the pipeline deployment agents may build executables (e.g., applications, code segments, etc.) of the software and software changes from a source code repository 265 (e.g., software repository system 103), which may store the software and software change specifications provided in part by the developers. In some embodiments, each app may get one repo with its source code, SAM templates for each environment (dev, int, test, and prod), as well as an SCR input file. Devs may also include a sonar properties file for coverage testing. The pipeline 202 may be tag-based, so each new deployment may be associated with a new tag. Most of the stages may use external scripts and respect branch deploy script variables, branch serverless script variables, and other branch script variables.

The build stage 205 may execute build steps, as well as onboarding to a log shipper if enabled. The build stage 205 may run first in the pipeline 202. The build stage 205 may include executing one or more build scripts that may utilize one or more template files to build the software and functions. The pipeline 202 may check for the presence of all required environment variables, such as account ID for the dev environment, bucket name for the dev environment, infrastructure endpoint URL, and/or the like. Template files may be linted for defined function names, sufficient memory allocation, runtime requirements, and/or the like. An app may be built according to its requirements, leaving artifacts (e.g., files created by the build process, WAR files, distribution packages, etc.) in a build directory for the rest of the stages to use.

The coverage stage 210 may execute unit tests and coverage reporting to pass to sonar-scan. The coverage stage 210 may include executing jobs to convert the coverage output to Cobertura if needed for parsing. There may be a code coverage stage for each type of app that can flow through the pipeline 202. In some implementations, coverage packages may be used for Python and Java, for example. The coverage stage 210 may be decoupled from the build stage 205 and may execute in parallel. The sonar-scan stage 215 may include a sonar module that may scan coverage reports and source code. The sonar-scan stage 215 may execute after the coverage stage 210 and independently of all other stages. The sonar-scan stage 215 may run quality gates and other code quality checks on source code.

The dev-deploy stage 220 may execute automatically after the build stage 205 is successfully executed, only deploying to the dev environment automatically. The int-deploy stage 225 may also be a deploy stage to deploy to int environment. One or more deploy scripts execute across all environments and may check for the presence of all required environment variables, such account ID for a specified environment, a bucket name for a specified environment, an infrastructure endpoint URL, an infrastructure role to assume when deploying, an authentication token, and/or the like. The pipeline 202 may use different templates for different environments that may specify subnets, security groups, and other configuration specifications for the different environments. The int-deploy stage 225 may unlock after dev-deploy is successful.

As illustrated, an SCR may be introduced after developers trigger software deployment into the development environment 220 and the integration environment 225. After deployment to the integration environment 225, but before deployment to the deployment testing stage 245, an SCR may be created at the SCR creation stage 230. The SCR creation may be triggered automatically after a successful integration deployment. SCR creation and updates on the SCRs and corresponding code/application may be made by infrastructure 102 in an automated way, with various details regarding SCRs and handling of SCRs are disclosed in U.S. Application No. 18/068,126, filed Dec. 19, 2022 (Now U.S. Pat. No. 12,153,916), which is incorporated by reference as if fully set forth herein for all purposes. The create SCR stage 230 may start the SCR process, to create the SCR. The create SCR stage 230 may include a module that creates an SCR using the provided details in an SCR input file and stores the SCR number in build artifact for future jobs. The create SCR stage 230 may unlock after a successful dev-deploy. The int update stage 235 may automatically follow. The int update stage 235 may include a module that updates the associated SCR with a current environment of the pipeline 202 in the pipeline flow.

The test-deploy stage 245 may start with the test SCR update stage 240 and may deploy to test. Execution of the test-SCR-update job corresponding to the test SCR update stage 240 may trigger test-deploy. The test-deploy stage 245 may unlock after successful int-deploy and int-SCR-update. The prod deploy stage 255 may start with a prod-SCR-update, and then deploy to prod. Prod-SCR-update may automatically start prod-deploy. The prod deploy stage 255 may unlock after successful test-deploy. The SCR close stage 255 may be the final stage, with the closing of the SCR. The SCR close stage 255 may include a module that closes the associated SCR as either complete or incomplete.

The pipeline deployment agents may run automated tests on the executables and monitor the tests to identify correct functioning, errors, conflicts, performance metrics, etc. as the executables progress toward production deployment 255. Upon successful testing and validations, the pipeline deployment agents may advance the executables toward production deployment 255. However, when incorrect functioning, errors, conflicts, failures to satisfy performance metrics threshold, and/or the like are identified, the pipeline deployment agents may rollback the executables to a prior version and/or stage, and may notify the developers of pertinent log data, test results, reports, and/or the like regarding the unsuccessful testing and/or validations.

The pipeline and event-streaming infrastructure 102 may include or otherwise correspond to infrastructure as code. The pipeline and event-streaming infrastructure 102 may include an event-streaming configurer 275 and/or an event-streaming engine 280. The event-streaming configurer 275 may be configured to accelerate overlaying the event-streaming infrastructure 102 on the event-streaming service system 115 of a cloud environment so that the pipeline 202 is integrated with the cloud environment to facilitate producing and consuming event data from the pipeline 202. The event-streaming configurer 275 may be further configured to accelerate onboarding of applications 106 to produce and consume event data via the event-streaming service system 115. The event-streaming configurer 275 may be further configured to configure the event-streaming service system 115 to facilitate producing and consuming event data under defined topics mapped to environments of the deployment pipeline 202. Disclosed embodiments provide improvements over traditional methods that would require several hours for an engineer to use command line instructions, log into each environment, run commands to get a service account provisioned, add descriptions, associate email addresses to the service account, wrangle the keys and secrets, etc. then do it all over again for another cluster in the system 115 in the cloud in order to integrate with different clusters. Disclosed embodiments, however, may accelerate the processes to 20 seconds or less, utilizing minimal input and minimal manual effort.

Figure 3:
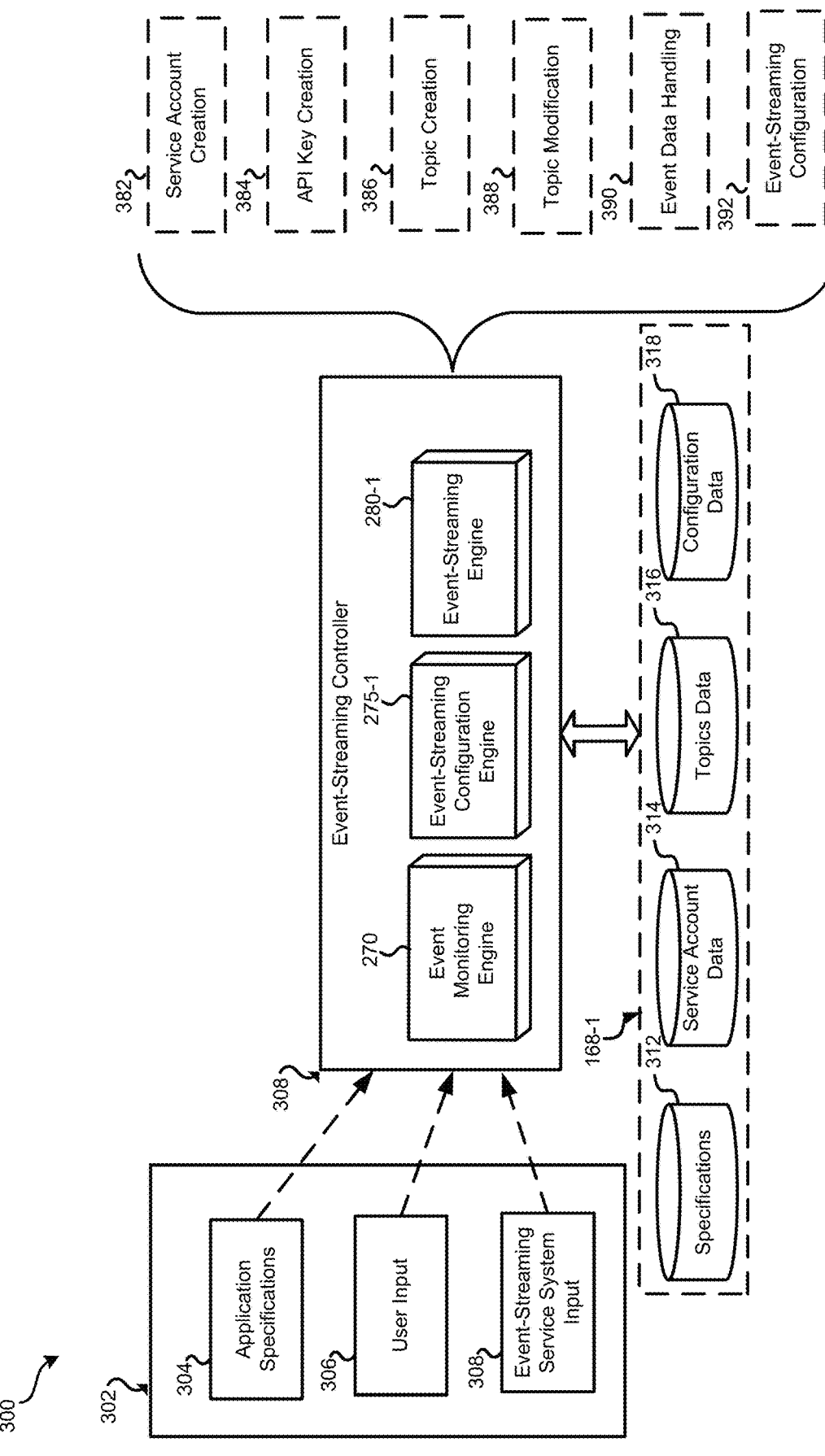
FIG. 3 illustrates a functional diagram of an event-streaming subsystem of the pipeline and event-streaming infrastructure to accelerate event-streaming with the deployment pipeline system, in accordance with embodiments according to the present disclosure.

FIG. 3 illustrates a functional diagram of an event-streaming subsystem 300 of the pipeline and event-streaming infrastructure 102 to accelerate event-streaming with the deployment pipeline system 200, in accordance with certain embodiments of the present disclosure. While the subsystem 300 is illustrated as being composed of multiple components, the subsystem 300 may be broken into a greater number of components or collapsed into fewer components. Each component may include any one or combination of computerized hardware, software, and/or firmware.

In some embodiments, the subsystem 300 may include or otherwise correspond to infrastructure as code. The subsystem 300 may be configured to cooperate with the applications 106 to provide the event-streaming features of the subsystem 300, with event-streaming aspects distributed between the client computing devices 105 and the remotely-located pipeline and event-streaming infrastructure 102. The subsystem 300 may communicate with the event-streaming service system 115 via API calls to configure the system 115 in order to set up service accounts, define topics, modify topics, add/remove producers and consumers, and/or the like configuration operations disclosed herein. As disclosed herein, the subsystem 300 may provide features to facilitate service account creation 382, API key creation 384, topic creation 386, topic modification 388, event data handling 390, and other event-streaming configuration features 392 disclosed herein.

In some embodiments, implementing the subsystem 300 may be, correspond to, and/or include one or more servers one or more network interfaces, one or more processors, memory, and/or other components disclosed herein. In some embodiments, the subsystem 300 may correspond to one or more adaptive processing and controlling devices 308 (which may be referenced as "event-streaming controller") and one or more storage repositories that may correspond to data stores 168. In various embodiments, the one or more adaptive processing and controlling devices 308 may include one or more of engines and/or modules that may be stored in the one or more memories and may include one or more software applications, executable with the processors, for receiving and processing requests and communications, performing configuring operations, performing event-streaming operations, and/or the like. The one or more of engines and/or other modules may be configured to perform any of the steps of methods described in the present disclosure.

As depicted, the subsystem 300 may include one or more repositories 168. For example, in various embodiments, a specifications repository 312 may store any suitable data pertaining to specifications disclosed herein. In various embodiments, a service account data repository 314 may store any suitable data pertaining to service accounts disclosed herein. In various embodiments, a topics data repository 316 store any suitable data pertaining to service accounts disclosed herein. In various embodiments, a mappings data repository 316 store any suitable data pertaining to referencing, linking, mapping, and/or the like disclosed herein. In various embodiments, a configurations repository 318 store any suitable data pertaining to configurations and states disclosed herein. Although the repositories are depicted as being separate, in various embodiments, a single repository may be utilized or separate repositories may be used in any suitable manner.

In some embodiments, the one or more engines of the event-streaming controller 308 may include one or more pipeline monitoring engines 336 that may include logic to implement and/or otherwise facilitate the event-streaming monitoring features disclosed herein. In various embodiments, for example, the event-streaming controller 308 (e.g., using the one or more monitoring engines 336) may receive pipeline input 302 by way of one or a combination of API calls, push operations, pull operations, polling operations, listening to one or more communication buses, and/or the like. Additionally or alternatively, the one or more engines of the pipeline controller 308 may include one or more event-streaming configuration engines 275 (e.g., event-streaming configurer 275) that may include logic to implement and/or otherwise facilitate the event-streaming configuration features disclosed herein. Additionally or alternatively, the one or more engines of the pipeline controller 308 may include one or more event-streaming engines 280 that may include logic to implement and/or otherwise facilitate the event-streaming features disclosed herein.

The pipeline input 302 may include one or more requests from one or more applications 106 and devices 105 to set up use of the event-streaming services of the event-streaming service system 115. Such requests may be initiated by one or more users. The monitoring engine 270 may receive and process the requests and may initiate setup operations by the event-streaming configuration engine 275. To facilitate onboarding of a particular application 106 to produce and consume event data via the event-streaming service system 115, the event-streaming configuration engine 275 may generate an interface to obtain specifications 304 of an application to produce and consume event data via the event-streaming service system 115. In some embodiments, the interface may correspond to directly interfacing with the application 106 to collect the specifications 304. The specifications 304 received may correspond to further pipeline input 302 that the monitoring engine 270 and/or the configuration engine 275 may collect. The configuration engine 270 may process the specifications 304, which may include an application identifier (e.g., name, unique identifier, associated MAC and/or IP addresses, associated email address, associated user ID, and/or the like in various embodiments).

Figure 4:
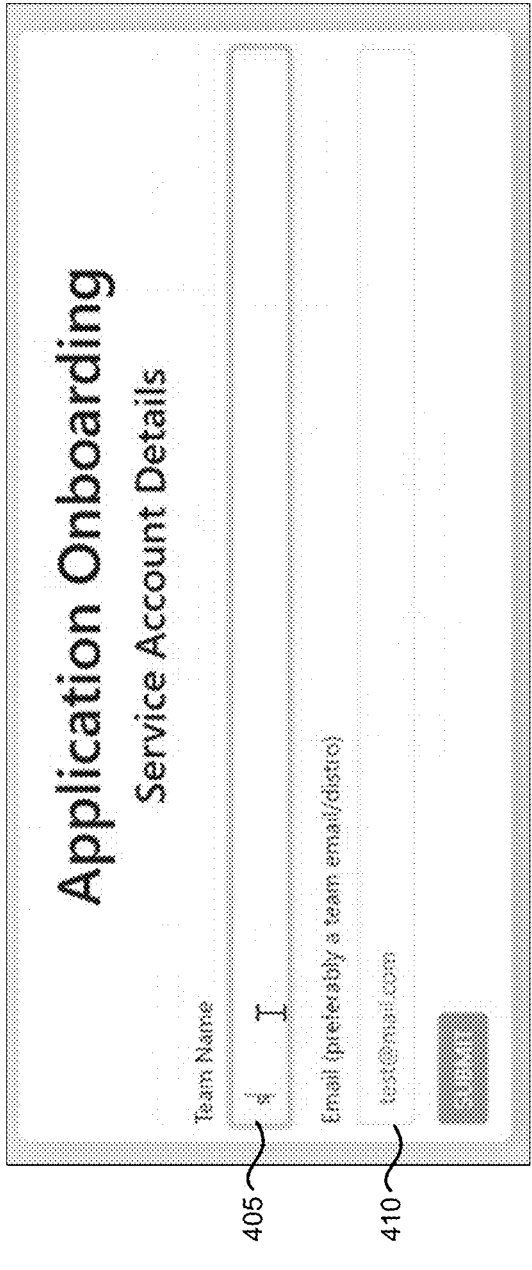
FIG. 4 illustrates a portion of an example user interface, in accordance with embodiments according to the present disclosure.

In some embodiments, the interface may correspond to a user interface, along with user-selectable user interface elements for a developer to provide input 306, make selections, and otherwise provide specifications 304 corresponding to the application 106. For example, FIG. 4 illustrates a portion of an example user interface 400, in accordance with embodiments of the present disclosure. The user interface 400 may facilitate collection of specifications 304 such as team name 405, team email/distro 410, and/or the like. Using the specifications 304, the configuration engine 270 may create one or more service accounts associated with the one or more applications 106, client devices 105, and/or users for which onboarding is requested. In some embodiments, service account creation may include the configuration engine 270 communicating with the event-streaming service system 115 and receiving input 308 from the system 115 to automatically create one or more service accounts without user intervention. The configuration engine 270 may scope one or more service accounts to a particular team corresponding to particular users and one or more particular environments, one or more particular applications 106, and/or one or more particular devices 105. When developers access their topics that will later be created, the service accounts may be associated with the topics created so that the service accounts can produce to, and consume from, the topics.

The configuration engine 270 may facilitate authentication and linking with the event-streaming infrastructure 115 of a service account associated with the application to produce and consume event data mapped to one or more environments of the deployment pipeline 102. The configuration engine 270 may generate a mapping of a service account to one or more environments of the deployment pipeline 102. Such a mapping may be based on pipeline input 302. For example, a request from one or more applications 106 and devices 105 to set up use of the event-streaming services may specify that the use is directed to one or more environments of the deployment pipeline 102. Such a specification may be determined/inferred from the application 106 requesting, for example, when the application 106 is used in a particular environment. Such a specification may be determined from user input 306 that specifies set up is to be for one or more particular environments. The configuration engine 275 may communicate with the event-streaming service system 115 to configure the system 115 according to the mappings of service accounts to one or more environments of the deployment pipeline 102. In some embodiments, the configuration engine 275 may communicate the mappings to the event-streaming service system 115 to configure the system 115.

The configuration engine 270 may enforce security limitations on service account creation. The configuration engine 270 may perform the setup and configuration operations safely. Security-wise, the provisioning of service accounts may be least privileged. Only those applications 106, client devices 105, and/or users that need it, get added to use it for producing and/or consuming event data. Accordingly, setup and configuration may be performed by the subsystem 300 without any security approvals, and, whenever a topic is created, no one can access the topic until they associate the service accounts with the topic.

The configuration engine 270 may provision a service account with API keys and secrets. In some embodiments, the configuration engine 270 may generate the API keys and secrets. In some embodiments, the API keys and secrets may be generated by the system 115, and the configuration engine 270 may collect the API keys and secrets from the system 115 via input 308. The API keys and secrets may be displayed via the application 106 and client 105. FIG. 5 illustrates an example list of account identifiers and associated keys and secrets that may be displayed. A list of account identifiers, keys, and secrets may be provisioned because there is separation between environments of the pipeline 202. For example, in order to do a proof of concept in dev, a develop key must be used. Once the development is ready to go to prod, a separate key will be needed. The event-streaming service system 115 in the cloud SaaS may be split between different control towers. So, the various environments may be mapped to different places, which is reflected by the list. The separation based on environment may be standard with respect to service accounts. If something goes wrong, the problem may be traced back to one or more particular service accounts and may be prevented from impacting multiple environments.

In some embodiments, the API keys and secrets may be displayed only once. Subsequently, onboarded applications 106 may authenticate with the keys and secrets when interacting with the event-streaming service system 115. For example, service accounts may be associated with one or more particular topics, to produce and consume to those one or more particular topics, and, when one or more corresponding applications 106 interact with those one or more particular topics, the one or more corresponding applications 106 may authenticate with the keys and secrets.

The event-streaming configuration engine 275 may facilitate producing and consuming event data under defined topics mapped to environments of the deployment pipeline 202. The event-streaming configuration engine 275 may generate an interface to obtain topic specifications that may correspond to a defined topic that may be mapped to the one or more environments of the deployment pipeline 202. The configuration engine 270 may provide a simple interface that requires minimal input. FIG. 6 illustrates an example interface 600 to facilitate topic creation and obtaining topic specifications. By way of example, the interface 600 may provide various interface elements to allow for specification of topic 605, topic name 610, application name 615, producers/consumers 620, and/or the like. With a particular topic identified, say Greenfield, to produce to, the configuration engine 270 may look up service accounts on different clusters and provide that to users in the form of a drop-down menu 625. For more advanced users, options for specification of other configurations may be presented. The interface 600 may provide various interface elements to allow for specification of partitions 625 of the system 115 to spread out the data across different slices, retention period 630 for data associated with the topic, and/or the like. If user specifications of such options are not received, the configuration engine 270 may automatically determine specifications appropriate for the topic use case.

Such topic specifications may correspond to input 306 received by the event monitoring engine 270 and/or the event-streaming configuration engine 275. The event-streaming configuration engine 275 may process the topic specifications and may create or cause creation of the defined topic. Automation may be run on the backend to create the topic. Based at least in part on the topic specifications, may configure the event-streaming service system 115 to facilitate producing and consuming event data under the defined topic mapped to the one or more environments of the deployment pipeline 202 and for the application 106 specified. The subsystem 300 may send notifications to mapped team members (e.g., emails notifications with a distro or any suitable notifications). In various embodiments, approvals may or may not be required for the automation to be fully executed to set up topics. For example, for some environments (e.g., dev and interview), the configuration engine 275 may set up the topics without approvals. For other environments (e.g., test and product), the configuration engine 275 may perform an approval acquisition process, communicate with particular entities (e.g., applications 106, devices 105, and/or users) to obtain approvals, for example, in order to verify that one or more particular service accounts specified should access the particular topics. The mappings of service accounts to one or more environments of the deployment pipeline 102 may be updated to further include associated topics, producers, consumers, and/or the like. In some embodiments, the configuration engine 275 may communicate the mappings to the event-streaming service system 115 to configure the system 115.

Figure 7:
FIG. 7 illustrates an example interface to facilitate publishing and/or subscribing to a topic, in accordance with embodiments according to the present disclosure.

As part of facilitating producing and consuming event data under defined topics mapped to environments of the deployment pipeline 202, the configuration engine 275 may provide an interface that allows a user to publish and/or subscribe to a topic. FIG. 7 illustrates an example interface 700 to facilitate publishing and/or subscribing to a topic. By way of example, the interface 700 may provide various interface elements to allow for specification of a destination account with a particular topic 705, a destination environment 710 (e.g., providing a drop-down menu to facilitate environment selection), topic name 715, application name 720, producers/consumers 725, and/or the like. With the specification of producers and/or consumers, particular entities (e.g., applications 106, devices 105, and/or users) may be specified as producers and/or consumers. Upon selections of one or more producers/consumers options 725, the interface 700 may load and reveal a list of entities that already exist according to the subsystem 300 and/or the system 115.

In some embodiments, the configuration engine 275 may communicate with the system 115 upon selection of the options 725 or prior to the selection, using the system 115 API to request and obtain a list of existing entities that can be exposed via the interface 700 for selection (e.g., with a drop-down menu). Once the publish/subscribe request is submitted with the interface 700, the configuration engine 275 may perform an approval acquisition process, communicate with particular entities to obtain approvals (e.g., in order to verify that one or more particular service accounts specified should access the particular topic).

The configuration engine 275 may communicate with the event-streaming service system 115 to configure the system 115 according to the publish/subscribe specifications. In so doing, the configuration engine 275 may convert publisher/subscriber names on the front end to publisher/subscriber IDs on the backend. The mappings of service accounts to one or more environments of the deployment pipeline 102 may be updated to further include associated topics, publishers, subscribers, producers, consumers, and/or the like. In some embodiments, the configuration engine 275 may communicate the mappings to the event-streaming service system 115 to configure the system 115.

The configurations facilitated by the subsystem 300 may be defined as infrastructure as code. The subsystem 300 may define the states of the configurations and then communicate with the system 115 in order to reconcile the states. After setup, the subsystem 300 (e.g., with the event-streaming engine 280) may communicate event data from applications 106 and at least one environment to the event-streaming service system 115. The event-streaming engine 280 may facilitate the overlay architecture and perform event handling, for example, to effect sending and receiving of event data to/from the event-streaming service system 115 per the configuration framework of what topics exist, which entities can produce to them, which entities can consume them, and/or the like. Messages produces and consumes may be set up and allowed from the configuration framework. If event-streaming service system 115 gets corrupted, everything created by the subsystem 300 may be re-instantiated with the persistent configuration framework.

After setup, the subsystem 300 (e.g., with the event-streaming engine 280) may communicate event data from applications 106 and at least one environment to the event-streaming service system 115. Likewise, the subsystem 300 may receive event data from the event-streaming service system 115 and communicate the event data to the same applications 106 and/or different applications 106 corresponding to the at least one environment. In various embodiments, the event data may correspond to user input messages and/or pipeline operations data and state changes (e.g., communicated by applications 106 and/or devices 105) that may be triggered with any suitable pipeline operations, such as those disclosed herein and those disclosed in U.S. application Ser. No. 18/068,126, filed Dec. 12, 2022, which is incorporated by reference for all purposes.

Figure 8:
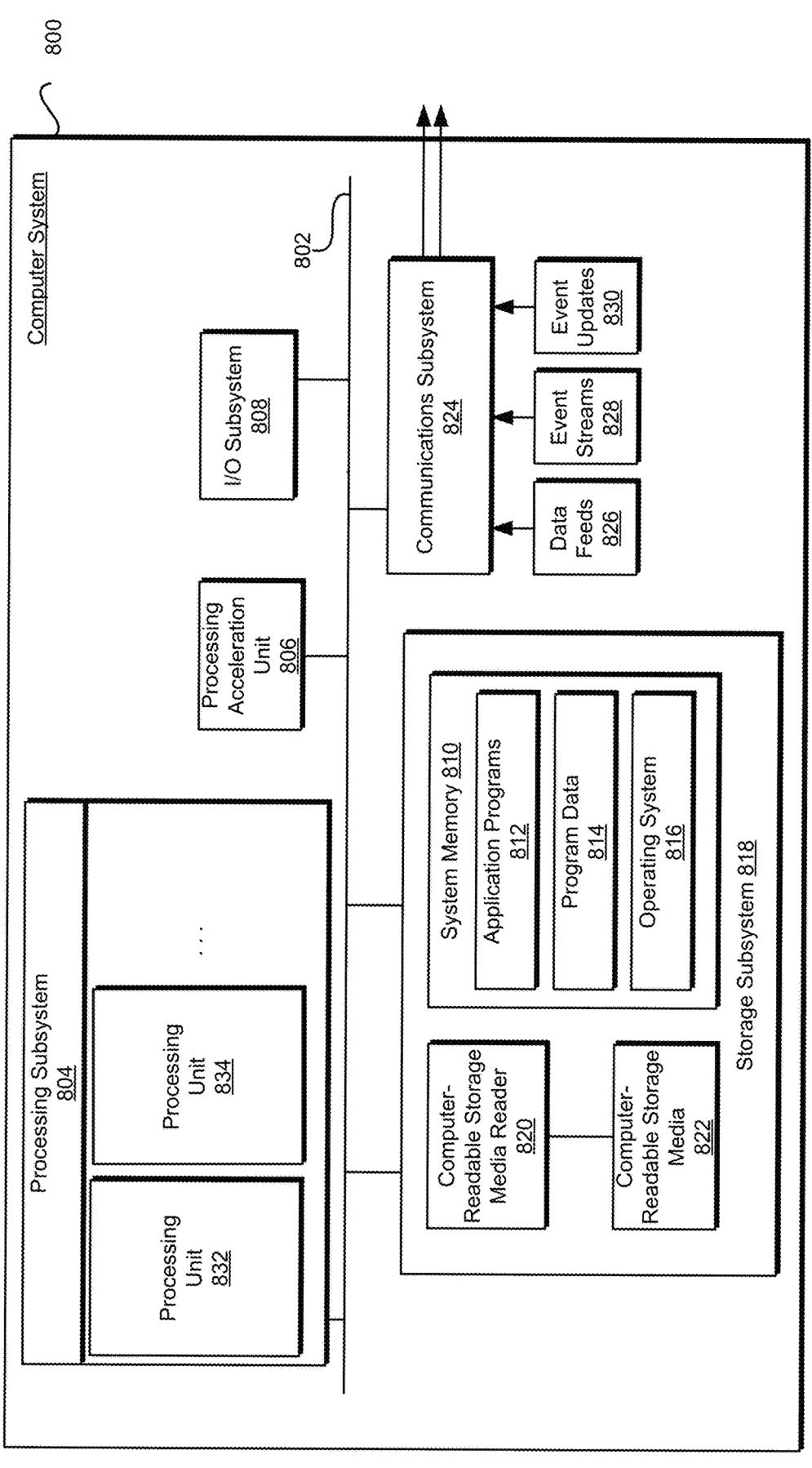
FIG. 8 illustrates an exemplary computer system, in accordance with embodiments according to the present disclosure.

FIG. 8 illustrates an exemplary computer system 800 that may be used to implement various embodiments. For example, in some embodiments, computer system 800 may be used to implement one or a combination of the pipeline and event-streaming infrastructure 102, the deployment pipeline 202, subsystem 300, system 115, and various servers and computer systems described above. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single-core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine. In certain embodiments, a processing acceleration unit 806 may be provided for performing customized processing or for off-loading some of the processing performed by processing subsystem 804 so as to accelerate the overall processing performed by computer system 800. In some embodiments, the processing acceleration unit 806 may correspond to the acceleration engine 340.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices that enable users to control and interact with an input device, game controllers, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some embodiments. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random-access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random-access memory (SRAM), dynamic random-access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some embodiments. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. In certain embodiments, storage subsystem 818 may also include a computer-readable storage media reader 820 that can further be connected to computer-readable storage media 822. Reader 820 may receive and be configured to read data from a memory device such as a disk, a flash drive, etc.

In certain embodiments, computer system 800 may support virtualization technologies, including but not limited to virtualization of processing and memory resources. For example, computer system 800 may provide support for executing one or more virtual machines. In certain embodiments, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G, 5G, or EDGE (enhanced data rates for global evolution), Wi-Fi (IEEE 802.XX family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A system comprising:

one or more processing devices; and memory communicatively coupled with and readable by the one or more processing devices and having stored therein processor-readable instructions which, when executed by the one or more processing devices, cause the one or more processing devices to perform operations comprising:

overlaying an event-streaming infrastructure on an event-streaming service system of a cloud environment so that a deployment pipeline to test and deploy software to a production computing service is integrated with the cloud environment to facilitate producing and consuming event data from the deployment pipeline, where:

the event-streaming infrastructure facilitates onboarding of applications to produce and consume event data via the event-streaming service system of the cloud environment;

the event-streaming infrastructure configures the event-streaming service system of the cloud environment to facilitate producing and consuming event data under defined topics mapped to environments of the deployment pipeline; and the event-streaming infrastructure facilitates authentication and linking of service accounts to produce event data under the defined topics mapped to the environments of the deployment pipeline;

generating with the event-streaming infrastructure an interface to obtain specifications of an application to produce and consume event data via the event-streaming service system of the cloud environment;

processing with the event-streaming infrastructure the specifications that correspond to the application to produce and consume event data via the event-streaming service system of the cloud environment; and facilitating authentication and linking with the event-streaming infrastructure of a service account associated with the application to produce and consume event data mapped to one or more of the environments of the deployment pipeline.

2. The system as recited in claim 1, the operations further comprising:

processing specifications of the service account; and using the specifications of the service account to create the service account with the event-streaming service system.

3. The system as recited in claim 1, where the authenticating the service account corresponding to the application comprises:

causing generating of a set of one or more keys and/or one or more secrets for subsequent use by the application when interacting with the event-streaming service, where the application is subsequently authenticated based at least in part on the set of one or more keys and/or one or more secrets when the application subsequently interacts with the event-streaming service.

4. The system as recited in claim 3, the operations further comprising:

exposing the set of one or more keys and/or one or more secrets to the application.

5. The system as recited in claim 4, the operations further comprising:

processing topic specifications corresponding to a defined topic mapped to the one or more of the environments of the deployment pipeline.

6. The system as recited in claim 5, the operations further comprising:

based at least in part on the topic specifications, configuring the event-streaming service system of the cloud environment to facilitate producing and consuming event data under the defined topics mapped to the one or more of the environments of the deployment pipeline;

communicating a first set of event data from the application and/or at least one environment of the one or more of the environments to the event-streaming service system;

receiving a second set of event data from the event-streaming service system; and communicating the second set of event data to the application and/or a second application corresponding to the at least one environment.

7. The system as recited in claim 1, where the event-streaming infrastructure corresponds to infrastructure as code.

8. One or more non-transitory, machine-readable media having machine-readable instructions thereon which, when executed by one or more processing devices, cause the one or more processing devices to perform operations comprising:

overlaying an event-streaming infrastructure on an event-streaming service system of a cloud environment so that a deployment pipeline to test and deploy software to a production computing service is integrated with the cloud environment to facilitate producing and consuming event data from the deployment pipeline, where:

the event-streaming infrastructure facilitates onboarding of applications to produce and consume event data via the event-streaming service system of the cloud environment;

the event-streaming infrastructure configures the event-streaming service system of the cloud environment to facilitate producing and consuming event data under defined topics mapped to environments of the deployment pipeline; and the event-streaming infrastructure facilitates authentication and linking of service accounts to produce event data under the defined topics mapped to the environments of the deployment pipeline;

generating with the event-streaming infrastructure an interface to obtain specifications of an application to produce and consume event data via the event-streaming service system of the cloud environment;

processing with the event-streaming infrastructure the specifications that correspond to the application to produce and consume event data via the event-streaming service system of the cloud environment; and facilitating authentication and linking with the event-streaming infrastructure of a service account associated with the application to produce and consume event data mapped to one or more of the environments of the deployment pipeline.

9. The one or more non-transitory, machine-readable media as recited in claim 8, the operations further comprising:

processing specifications of the service account; and using the specifications of the service account to create the service account with the event-streaming service system.

10. The one or more non-transitory, machine-readable media as recited in claim 8, where the authenticating the service account corresponding to the application comprises:

causing generating of a set of one or more keys and/or one or more secrets for subsequent use by the application when interacting with the event-streaming service, where the application is subsequently authenticated based at least in part on the set of one or more keys and/or one or more secrets when the application subsequently interacts with the event-streaming service.

11. The one or more non-transitory, machine-readable media as recited in claim 10, the operations further comprising:

exposing the set of one or more keys and/or one or more secrets to the application.

12. The one or more non-transitory, machine-readable media as recited in claim 11, the operations further comprising:

processing topic specifications corresponding to a defined topic mapped to the one or more of the environments of the deployment pipeline.

13. The one or more non-transitory, machine-readable media as recited in claim 12, the operations further comprising:

based at least in part on the topic specifications, configuring the event-streaming service system of the cloud environment to facilitate producing and consuming event data under the defined topics mapped to the one or more of the environments of the deployment pipeline;

communicating a first set of event data from the application and/or at least one environment of the one or more of the environments to the event-streaming service system;

receiving a second set of event data from the event-streaming service system; and communicating the second set of event data to the application and/or a second application corresponding to the at least one environment.

14. The one or more non-transitory, machine-readable media as recited in claim 8, where the event-streaming infrastructure corresponds to infrastructure as code.

15. A method comprising:

overlaying an event-streaming infrastructure on an event-streaming service system of a cloud environment so that a deployment pipeline to test and deploy software to a production computing service is integrated with the cloud environment to facilitate producing and consuming event data from the deployment pipeline, where:

the event-streaming infrastructure facilitates onboarding of applications to produce and consume event data via the event-streaming service system of the cloud environment;

the event-streaming infrastructure configures the event-streaming service system of the cloud environment to facilitate producing and consuming event data under defined topics mapped to environments of the deployment pipeline; and the event-streaming infrastructure facilitates authentication and linking of service accounts to produce event data under the defined topics mapped to the environments of the deployment pipeline;

generating with the event-streaming infrastructure an interface to obtain specifications of an application to produce and consume event data via the event-streaming service system of the cloud environment;

processing with the event-streaming infrastructure the specifications that correspond to the application to produce and consume event data via the event-streaming service system of the cloud environment; and facilitating authentication and linking with the event-streaming infrastructure of a service account associated with the application to produce and consume event data mapped to one or more of the environments of the deployment pipeline.

16. The method as recited in claim 15, further comprising:

processing specifications of the service account; and using the specifications of the service account to create the service account with the event-streaming service system.

17. The method as recited in claim 15, where the authenticating the service account corresponding to the application comprises:

causing generating of a set of one or more keys and/or one or more secrets for subsequent use by the application when interacting with the event-streaming service, where the application is subsequently authenticated based at least in part on the set of one or more keys and/or one or more secrets when the application subsequently interacts with the event-streaming service.

18. The method as recited in claim 17, further comprising:

exposing the set of one or more keys and/or one or more secrets to the application.

19. The method as recited in claim 18, further comprising:

processing topic specifications corresponding to a defined topic mapped to the one or more of the environments of the deployment pipeline.

20. The method as recited in claim 19, further comprising:

based at least in part on the topic specifications, configuring the event-streaming service system of the cloud environment to facilitate producing and consuming event data under the defined topics mapped to the one or more of the environments of the deployment pipeline;

communicating a first set of event data from the application and/or at least one environment of the one or more of the environments to the event-streaming service system;

receiving a second set of event data from the event-streaming service system; and communicating the second set of event data to the application and/or a second application corresponding to the at least one environment.

* * * * *